Aug. 7, 1956   E. H. TERRY   2,758,044
LAMINATED FLOORING
Filed Aug. 24, 1953

INVENTOR
EDWARD H. TERRY
BY
*Mason & Graham*
ATTORNEYS

United States Patent Office 2,758,044
Patented Aug. 7, 1956

2,758,044

LAMINATED FLOORING

Edward H. Terry, Los Angeles, Calif., assignor of one-half to Ada M. Terry, Los Angeles, Calif.

Application August 24, 1953, Serial No. 376,095

2 Claims. (Cl. 154—45.9)

This invention has to do with laminated products in strip and sheet form such as are used in building construction for walls, flooring, cabinet work and the like.

An object of my invention is to provide a novel laminated product which is particularly suited for use as a decorative nad utilitarian flooring material but which also has other uses.

While wood, commonly in the form of tongue and grooved strips, has been used for years as a flooring material, it has certain limitations. For example, it does not possess the following properties which are highly desirable in a flooring material. One such property of flooring from an interior decoration standpoint is a wood surface where there is no limitation upon the wood which can be used or the manner in which it is matched. This is possible only in a laminated construction where a wood veneer of desired type can be used for the top lamina. It is also desirable to have a choice of materials other than wood for the top surface to the end of meeting both decorative and utilitarian requirements.

Another desirable property of a flooring material is stability by which I mean that the material should be relatively stiff in all directions and not subject to buckling or warpage.

A further desirable property of flooring is the ability thereof to conform to or compensate for irregularities in the surface upon which the flooring is laid.

In addition to the above properties, flooring should preferably be impervious to moisture, and insect proof.

A particular object of my invention is to provide a new and improved flooring material which has the above-mentioned desirable properties, is durable, and can be readily manufactured and installed.

A further object is to provide a laminated material or product of low heat conductivity.

Still another object is to provide a flooring material which lends itself to various installation practices and in this connection it is an object to provide a novel method of installing flooring.

These and other objects will be apparent from the drawing and the following description.

Referring to the drawing.

Figure 1:
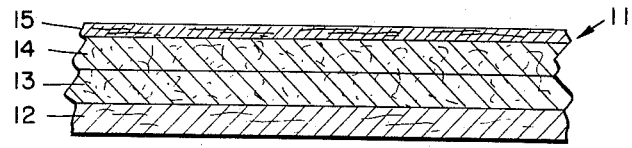
Fig. 1 is a cross-sectional view of a laminated material embodying a preferred form of the invention.

More particularly describing the invention, while my laminated product has many uses, it will be described and shown for use as a flooring. In Fig. 1, I show a laminated sheet or strip 11 made up of several layers or plies which are firmly bonded together. For the lower or bottom layer 12, I prefer to provide a material which has the ability to conform to irregularities in the surface upon which the material is laid and for this purpose it should be relatively soft. Also, the lowermost layer preferably should be of a sound-deadening material and have the property of providing insulation against heat and cold. It should also be capable of absorbing moisture without deterioration. Balsa wood meets these requirements. However, I do not wish to limit myself to this material.

The core of my laminated material in the preferred form comprises the layers 13 and 14. These should be relatively stiff, hard, impervious to moisture and insect proof and may be made of so-called hardboard, that is, a wood aggregate composition substance such as tempered S2S Masonite for example. To the layer 14 there is secured a surfacing veneer layer 15 which, in Fig. 1, is shown as hardwood. The laminae are bonded together by a suitable waterproof cement or adhesive, and preferably one which is insect proof as well, such as a urea formaldehyde resin, and the laminae are pressed together to obtain a perfect bond, heat being applied if the cement is of a thermosetting type. In this connection it should be pointed out that the layers 13, 14 and 15 may be first joined in a press and the lower layer 12 of softer material subsequently applied. The layers may be of various thicknesses, however an all-purpose product may have a top layer of ⅛" in thickness, a core of two layers each ⅛" in thickness, and a bottom layer of ⅛" in thickness.

It will be apparent that the construction described achieves the various objects set forth above. By making the core of two layers with an intervening layer of cement or adhesive, I achieve exceptional stiffness of the core which imparts unusual stability to the product as a whole. At the same time the product is flexible, the lower layer accommodating for irregularities in the underflooring and imparting a certain resilience. Both durability and decorativeness are supplied by the upper layer. The product provides excellent insulation against heat and cold.

Figure 2:
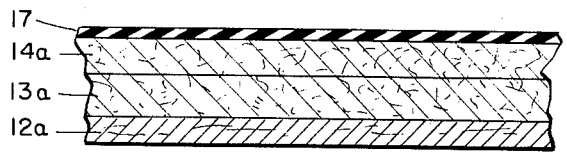
Fig. 2 is a fragmentary cross-sectional view of another form of the invention.

In Fig. 2 I show another form of the invention in which the layers 12a, 13a and 14a correspond to the layers 12, 13 and 14 of Fig. 1. In this form of the invention, however, I show an upper surface layer 17 of composition rubber. This is bonded to layer 14a with an adhesive or cement which is compatible with both the hardboard of layer 14a and the composition rubber of layer 17. Other materials may be substituted for the rubber composition material of layer 17, as for example, synthetic rubber, plastic substances and the like.

Figure 3:
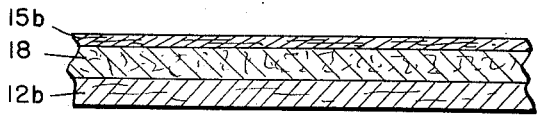
Fig. 3 is a fragmentary cross-sectional view of another modification.

In Fig. 3 I show a modified type of construction wherein the core is made from a single sheet 18 of so-called hardboard. The lower layer 12b may be of balsa wood and the upper layer 15b of hardwood or other desired material.

Figure 4:
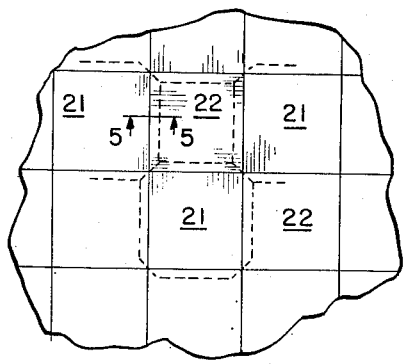
Fig. 4 is a fragmentary plan view of a type of flooring.
Figure 5:
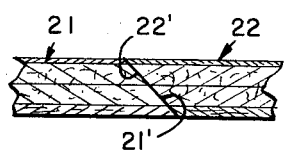
Fig. 5 is a sectional view on line 5—5 of Fig. 4, on a larger scale.

My flooring-laminate is adaptable to being laid in sheets, tongue and grooved strips, or other methods common in the trade. However, it is also particularly suitable for making special designs and in Figs. 4 and 5 I show a unique type of parquet flooring. This comprises the pieces 21 and 22, arbitrarily shown as square. The pieces 22 are beveled at their margins to present undercut faces 22' at a 45° angle to the surface of the piece. The pieces 21 are beveled to provide upwardly disposed marginal faces 21' at a 45° angle. The pieces are laid with glue or adhesive securing them. With this type of flooring the individual element can be precut to a given pattern and size for a given floor area thereby eliminating any cutting on the job.

Although I have illustrated and described preferred forms of my invention, I contemplate that various changes and modifications can be made without departing from the invention, the scope of which is indicated by the following claims. For example, while I prefer to use hardboard as a core material, I may also use plywood of various types and without restriction as to the direction of the grain in adjacent layers.

I claim:
1. A laminated product for flooring consisting of a core formed of at least one stiff sheet of hardboard wood aggregate composition substance, a decorative sheet of hardwood bonded to one side surface of said core, and a sheet of balsa wood bonded to the other side surface of said core and forming the base of the laminated product, said balsa wood sheet extending throughout the entire length and width of the hardwood sheet.

2. A laminated product for flooring consisting of a core formed of at least one stiff sheet of hardboard wood aggregate composition substance, a decorative facing sheet bonded to one side surface of said core, and a sheet of balsa wood bonded to the other side surface of said core and forming the base of the laminated product, said balsa wood sheet extending throughout the entire length and width of the facing sheet.

References Cited in the file of this patent

UNITED STATES PATENTS

| | | |
|---|---|---|
| 820,221 | Lindley | May 8, 1906 |
| 1,226,788 | MacLeith | May 22, 1917 |
| 1,626,117 | Munroe | Apr. 26, 1927 |
| 2,019,834 | Vierling et al. | Nov. 5, 1935 |
| 2,075,317 | Upson | Mar. 30, 1937 |
| 2,263,536 | Dike | Nov. 18, 1941 |
| 2,336,235 | Fischer | Dec. 7, 1943 |
| 2,550,002 | Chorney | Apr. 24, 1951 |